(12) United States Patent
Ambroladze et al.

(10) Patent No.: US 10,831,661 B2
(45) Date of Patent: Nov. 10, 2020

(54) COHERENT CACHE WITH SIMULTANEOUS DATA REQUESTS IN SAME ADDRESSABLE INDEX

(71) Applicant: International Business Machines Corporation, Armonk, NY (US)

(72) Inventors: Ekaterina M. Ambroladze, Somers, NY (US); Tim Bronson, Round Rock, TX (US); Robert J. Sonnelitter, III, Mount Vernon, NY (US); Deanna P. D. Berger, Hyde Park, NY (US); Chad G. Wilson, Poughkeepsie, NY (US); Kenneth Douglas Klapproth, Travis, TX (US); Arthur O'Neill, Poughkeepsie, NY (US); Michael A. Blake, Wappingers Falls, NY (US); Guy G. Tracy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/380,307

(22) Filed: Apr. 10, 2019

(65) Prior Publication Data
US 2020/0327058 A1  Oct. 15, 2020

(51) Int. Cl.
*G06F 12/0815* (2016.01)

(52) U.S. Cl.
CPC .. *G06F 12/0815* (2013.01); *G06F 2212/1021* (2013.01)

(58) Field of Classification Search
CPC .................................................. G06F 12/0815
See application file for complete search history.

(56) References Cited

U.S. PATENT DOCUMENTS

| | | | |
|---|---|---|---|
| 5,826,052 A | 10/1998 | Stiles et al. | |
| 6,047,357 A | 4/2000 | Bannon et al. | |
| 6,823,409 B2 | 11/2004 | Jones et al. | |
| 7,284,094 B2 | 10/2007 | Hrusecky et al. | |
| 8,868,838 B1 | 10/2014 | Glasco et al. | |
| 9,244,724 B2 | 1/2016 | Ghai et al. | |
| 9,244,851 B2 | 1/2016 | Ambroladze et al. | |

(Continued)

FOREIGN PATENT DOCUMENTS

WO    2016160159 A1   10/2016

*Primary Examiner* — Sean D Rossiter
(74) *Attorney, Agent, or Firm* — Cantor Colburn LLP; William Kinnaman

(57) ABSTRACT

Processing simultaneous data requests regardless of active request in the same addressable index of a cache. In response to the cache miss in the given congruence, if the number of other compartments in the given congruence class that have an active operation is less than a predetermined threshold, setting a Do Not Cast Out (DNCO) pending indication for each of the compartments that have an active operation in order to block access to each of the other compartments that have active operations and, if the number of other compartments in the given congruence class that have an active operation is not less than a predetermined threshold, blocking another cache miss from occurring in the compartments of the given congruence class by setting a congruence class block pending indication for the given congruence class in order to block access to each of the other compartments of the given congruence class.

20 Claims, 4 Drawing Sheets

(56) References Cited

U.S. PATENT DOCUMENTS

| | | |
|---|---|---|
| 9,703,661 B2 | 7/2017 | Ambroladze et al. |
| 2004/0022094 A1 | 2/2004 | Radhakrishnan et al. |
| 2008/0177953 A1 | 7/2008 | Bell et al. |
| 2009/0031082 A1 | 1/2009 | Ford et al. |
| 2011/0153986 A1 | 6/2011 | Alexander et al. |
| 2013/0339623 A1* | 12/2013 | Ambroladze ....... G06F 12/0815 711/134 |
| 2014/0181402 A1 | 6/2014 | White |
| 2015/0347297 A1 | 12/2015 | Hagersten et al. |

* cited by examiner

COHERENT CACHE WITH SIMULTANEOUS DATA REQUESTS IN SAME ADDRESSABLE INDEX

BACKGROUND

The invention relates generally to cache coherency maintenance and, more particularly, to enabling concurrent cache line operations to a plurality of cache sets of a congruence class.

Requests for data can be served faster from a cache. If requested data is contained within a cache, it is referred to as a cache hit and the requested data is simply read from the cache. If the requested data is not contained in the cache, it is referred to as a cache miss. In the event of a cache miss, the requested data has to be fetched from higher levels of cache or from system memory which slows down a central processing unit (CPU). Thus, the greater number of requests that can be handled in parallel from the cache the better the overall system performance.

Only a single cache miss is allowed per congruence class (addressable index) of the cache. A CPU data fetch from the cache that results in a miss has to then cast out a valid set from the congruence class and bring in the missed line to be stored in that set. At the time of the miss, control logic picks a set to perform that operation in. Between the time the cache system invalidates the address corresponding with the compartment that had the miss and a new line is brought it, the set does not contain a valid address in order to protect the set from being picked by another miss. Because the set no longer has a valid address, other compartments in that congruence class having that invalid but in use index address are not accessible by other cache controllers for subsequent operations and the cache does not know which of the sets in that congruence class are being used for any operations. In other words, the cache system blocks the entire congruence class from access since it cannot determine which compartments are available to evict and place new data into. Thus, what is needed is the ability to process coherent cache simultaneous data requests regardless of having active requests in the same congruence class.

SUMMARY

According to a non-limiting embodiment, a computer implemented method for enabling concurrent cache line operations to a plurality of cache sets of a congruence class is provided. The method includes recognizing, by a plurality of cache controllers, a plurality of controller operations to a given congruence class in congruence classes of the cache, each of the congruence classes having an addressable index, wherein the congruence classes are rows in the cache and sets are columns in the cache, such that each of the sets is included in each of the congruence classes, wherein the cache miss corresponds with a compartment in the given congruence class having a given addressable index, and wherein other sets are in the given congruence class having the given addressable index. The method also includes, in response to the cache miss in the given congruence class having the given addressable index, at the time of set selection for the cache miss, determining a number of other compartments in the given congruence class which have an active operation. The method then includes determining if the number of other compartments in the given congruence class that have an active operation in any hit or miss state of that line is less than a predetermined threshold and if the number of other compartments in the given congruence class that have an active operation is less than a predetermined threshold, setting a Do Not Cast Out (DNCO) pending indication for each of the other compartments which have an active operation in order to block access to each of the other compartments while having an active operation thereby precluding each compartment with blocked access from subsequent operations. The method also then includes, if the number of other compartments in the given congruence class that have an active operation is not less than a predetermined threshold, blocking another cache miss from occurring in the other compartments of the given congruence class by setting a congruence class block pending indication for the given congruence class in order to block access to each of the other compartments of the given congruence class, thereby precluding the given congruence class from subsequent operations.

According to another non-limiting embodiment, a cache of a computing system storing cache data is provided. The cache includes cache controllers and processing circuits, wherein at least one cache controller recognizes a cache miss to a given congruence class in congruence classes of the cache, each of the congruence classes having its own addressable index, wherein the congruence classes are rows in the cache, wherein sets are columns in the cache, such that each of the sets is included in each of the congruence classes, wherein the cache miss corresponds with a compartment in the given congruence class having a given addressable index and other sets are in the given congruence class having the given addressable index The cache also includes in response to the cache miss in the given congruence class having the given addressable index, at the time of set selection for the cache miss, determining a number of other compartments in the given congruence class that have an active operation and determining if the number of other compartments in the given congruence class that have an active operation is less than a predetermined threshold. Also, if the number of other compartments in the given congruence class that have an active operation is less than a predetermined threshold, the cache includes setting a DNCO pending indication for each of the other compartments which have an active operation in order to block access to each of the other compartments while having an active operation thereby precluding each compartment with blocked access from subsequent operations and, if the number of other compartments in the given congruence class that have an active operation is not less than a predetermined threshold, blocking another cache miss from occurring in the other compartments of the given congruence class by setting a congruence class block pending indication for the given congruence class in order to block access to each of the other compartments of the given congruence class, thereby precluding the given congruence class from subsequent operations.

According to yet another non-limiting embodiment, a computer program product is provided. The computer program product includes a computer readable storage medium having program instructions embodied therewith, the program instructions executable by a computer processor to cause the computer processor to perform a method for enabling concurrent cache line operations to a plurality of cache sets on a congruence class. A non-limiting example of the method includes recognizing, by a plurality of cache controllers, a plurality of controller operations to a given congruence class in congruence classes of the cache, each of the congruence classes having an addressable index, wherein the congruence classes are rows in the cache and sets are columns in the cache, such that each of the sets is included in each of the congruence classes, wherein the cache miss corresponds with a compartment in the given congruence class having a given addressable index, and wherein other sets are in the given congruence class having the given addressable index. The method also includes, in response to the cache miss in the given congruence class having the given addressable index, at the time of set selection for the cache miss, determining a number of other compartments in the given congruence class which have active operations. The method then includes determining if the number of other compartments in the given congruence class that have an active operation is less than a predetermined threshold and, if the number of other compartments in the given congruence class that have an active operation is less than a predetermined threshold, setting a DNCO pending indication for each of the other compartments that have an active operation in order to block access to each of the other compartments while having an active operation thereby precluding each compartment with blocked access from subsequent operations. If the number of other compartments in the given congruence class that have an active operation is not less than a predetermined threshold, blocking another cache miss from occurring in the other compartments of the given congruence class by setting a congruence class block pending indication for the given congruence class in order to block access to each of the other compartments of the given congruence class, thereby precluding the given congruence class from subsequent operations.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
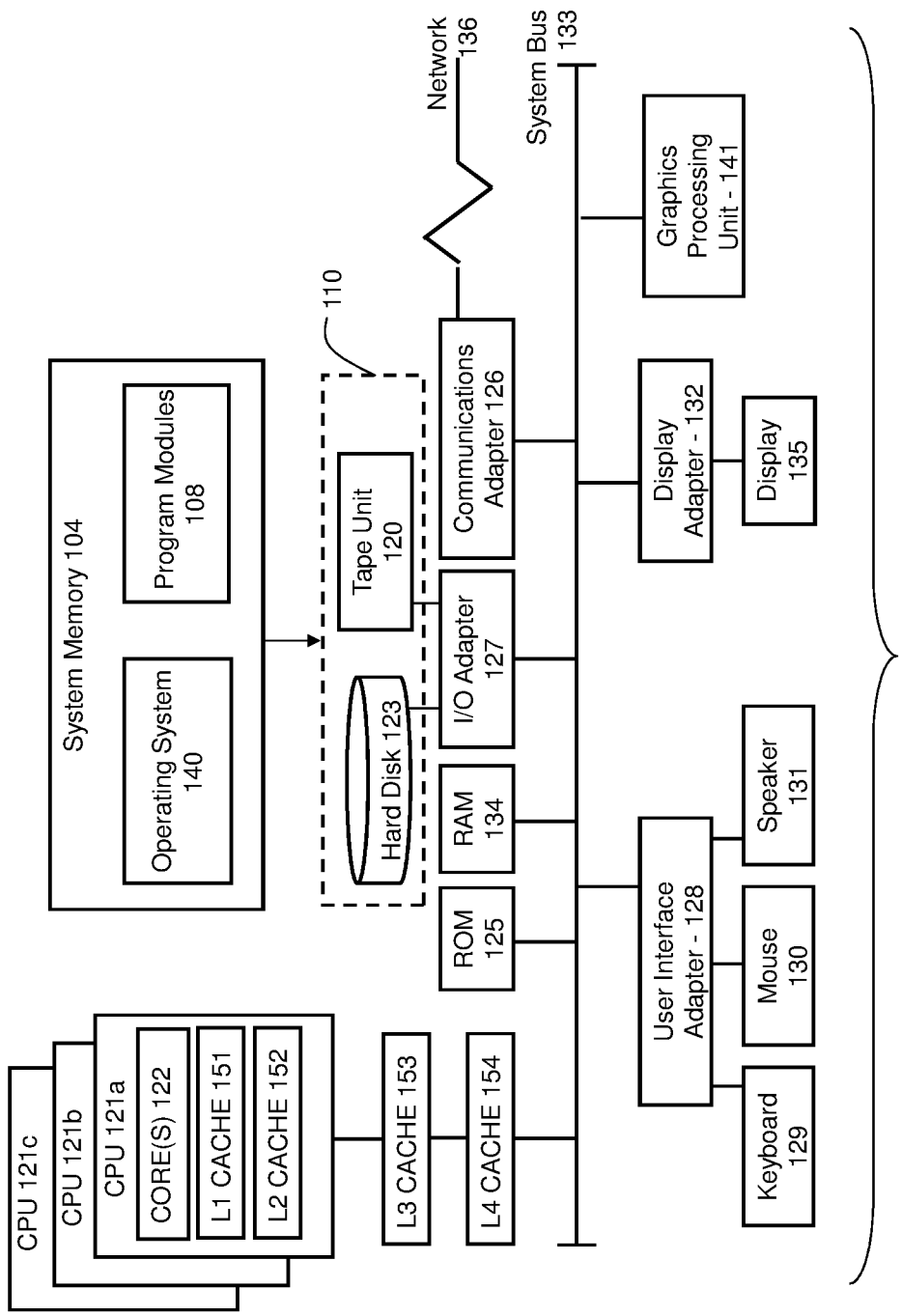
FIG. 1 is a block diagram illustrating a computer system having multiple levels of caches for processing coherent cache data in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring now to FIG. 1, a computer system 100 is illustrated according to a non-limiting embodiment. In FIG. 1 the computer system 100 is shown in the form of a general-purpose computer device that also may be referred to as a processing device. In some embodiments, the computer system 100 may be a management server, a web server, laptop computer, tablet computer, netbook computer, personal computer (PC), a desktop computer, or any programmable electronic device capable of receiving and sending data and processing program instructions.

The components of computer system 100 may include, but are not limited to, one or more central processing units (CPUs) 121a, 121b, 121c, etc. (collectively or generically referred to as processor(s) 121). In one or more embodiments, each processor 121 includes one or more cores 122 and one or more caches. There may be any number of cores with each processor 121. Processors 121 are coupled to system memory (RAM) 134 and various other components via a system bus 133. Read only memory (ROM) 125 is coupled to the system bus 133 and may include a basic input/output system (BIOS), that controls certain basic functions of computer system 100.

Also, each processor 121 may include any number of cache levels operatively connected to one another. For example, each processor 121 may each include (on chip) a level one (L1) cache 151 and a level two (L2) cache 152. The L1 cache 151 and L2 cache 152 may be on-processor (hardware) memory for caching (i.e., retaining) data on the processor 121. The processors 121 may be operatively connected to a level three (L3) cache 153 and a level four (L4) cache 154. Data retrieved from system memory 104 may be cached in any of the caches (e.g., in the L1 cache 151, L2 cache 152, L3 cache 153, and/or L4 cache 154). Typically, the cache size (in the cache hierarchy) increases as the cache level increases. L1 cache 151 is the smallest size cache and the closest to the processor core 122. The L4 cache 153 is the largest size cache and furthest away from the processor core 122 but system memory 104 is even larger. All the caches can be inclusive caches, that contain all the data that resides in the lower caches, or victim caches, that contain only data that is sent up from lower caches. It should be understood that different cache arrangements, in both number of cache levels and location within the system, are recognized by embodiments of the present invention. Further, some cache levels may be dedicated to a core 122, while other cache levels may be shared between multiple cores 122 of a processor 121.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 120 or any other similar component. I/O adapter 127, hard disk 123, and tape storage device 120 are collectively referred to herein as mass storage 110.

Depending on the configuration and type of computer system 100, system memory 104 includes, but is not limited to, volatile storage (e.g., random access memory), non-volatile storage (e.g., read-only memory), flash memory, or any combination of such memories. According to an aspect, the system memory 104 includes an operating system 140 and one or more program modules 108 for execution by one or more processors 121 via the caches 124. Operating system 140 for execution on the processing system 100 may be stored in mass storage 110. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, that may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, that may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 110, input means such as keyboard 129 and mouse 130, and output capability including speaker 131 and display 135. In one embodiment, a portion of RAM 134 and mass storage 110 collectively store the operating system 140 to coordinate the functions of the various components shown in FIG. 1.

Figure 2:
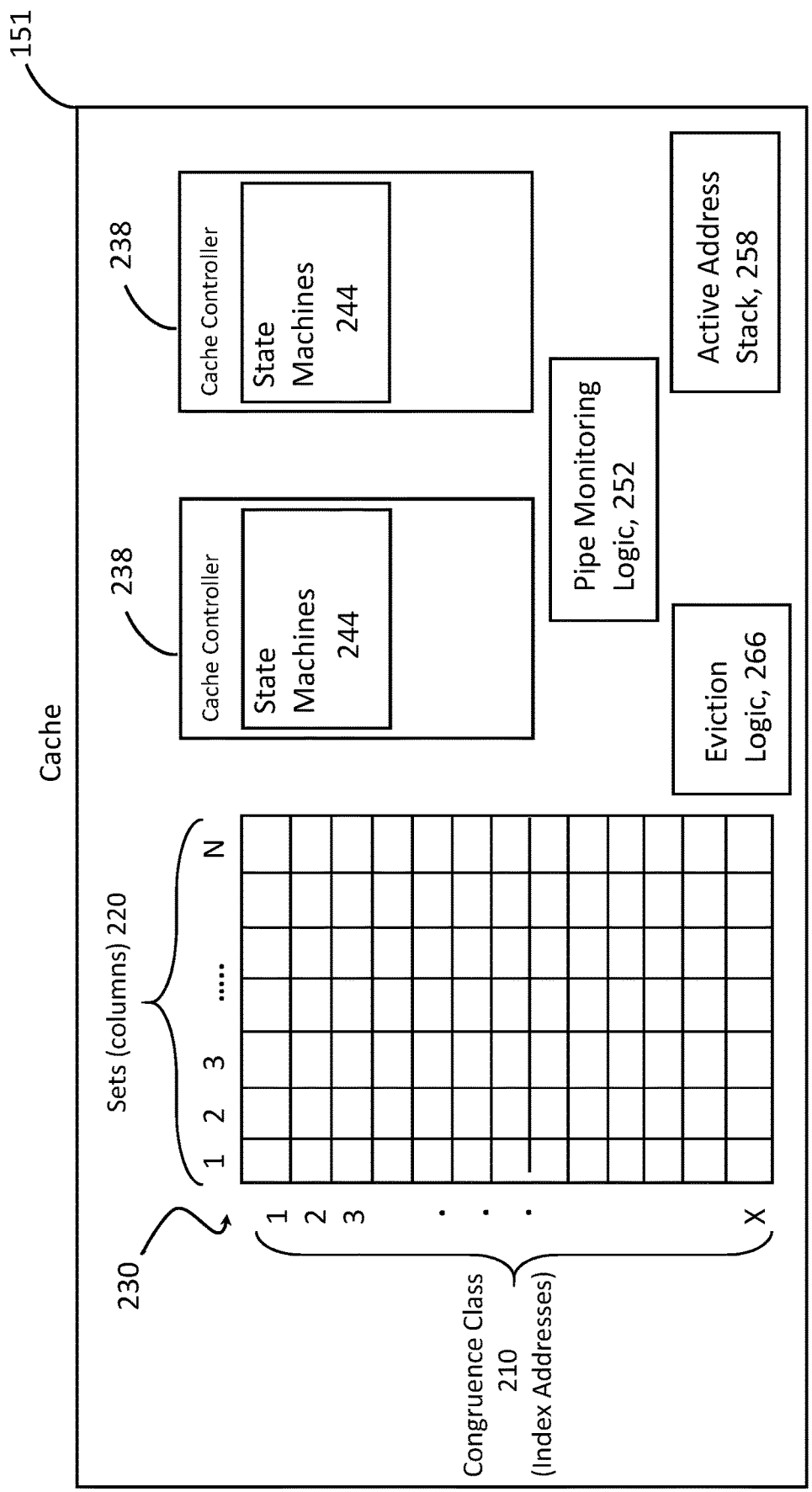
FIG. 2 is a block diagram illustrating a cache including cache controllers for processing coherent cache simultaneous data requests regardless of active requests in the same addressable index according to one or more embodiments of the present invention.

FIG. 2 depicts further details of the caches that can be applied to L1 cache 151, L2 cache 152, L3 cache 153, and/or L4 cache 154 according to embodiments herein. For ease of explanation and not limitation, reference is made to L1 cache 15 in FIG. 2. However, the details and various explanations also apply to L2 cache 152, L3 cache 153, and/or L4 cache 154. Cache 151, for example, may have 1 to X congruence classes (rows) 210 and 1 to N sets (columns) 220 as understood by those skilled in the art. Each congruence class 210 can also be referred to as an addressable index or index address. However, for simplicity, the numerous memory elements or cells, defined by an intersection of a single corresponding congruence class 210 and a single corresponding set 220, where each memory element stores data, are herein referred to as compartments 230.

The compartments 230 are integrated circuits for storing data as understood by one skilled in the art. The cache 151 also includes one or more cache controllers 238 that control loading (writing), evicting, and reading (requesting) data in the compartments of the cache 151. A cache directory (not shown) has a grid of status indications where each individual status indication directly represents a corresponding compartment in the cache 151. Each set 220 has its own corresponding address and bits that indicate the status, valid or invalid, empty, owned, offline, etc. The cache controller 238 controls, makes updates, and manages the cache directory as well as compartments 230 of the cache 151. There can also be cache controllers 238 with different functionalities, such as fetch index controller or eviction index controller as an example. The cache controller 238 will contain an indication that it is working on an active operation with specific set Do Not Cast Out (DNCO) pending indication, sometimes referred to as setting a DNCO pending indication, and another indication that it is working on an active operation with a set in the congruence class and, thus, all the compartments of the entire congruence class need to be blocked referred to as congruence class block pending or, simply, congruence class block. Another indicator cache controller 238 will provide its valid operation indicator.

The one or more cache controllers 238 may include processing circuits that may be application specific integrated circuits (ASIC) and various state machines 244. The state machines (e.g., finite-state machine (FSM) or finite-state automaton) can read a series of inputs. When the state machine reads an input it will switch to a different state. Each state specifies which state to switch to for a given input.

The pipe monitoring logic 252 is logic that allows cache controllers 238 to arbitrate for resources, access data that is in the cache (not shown), move data from one location to another and update the cache directory (not shown) based on select set of rules for data storage as understood by those skilled in the art.

Active address stack 258 is storage location where each cache controller 238 will store address and status information about the operation it is currently operating on. It can store information as such, full address where congruence class/addressable index is part of that and set. This associated storage information will be filled once the cache controller 238 goes through the pipe to determine if the operation target address is contained inside the cache. If it is a hit, then full address and hit set are loaded into the storage element of the active address stack 258. If it is a miss, the eviction logic 266 picks a set and the full address of miss along with that set is loaded into the storage element of the active address stack 258 for that cache controller 238. Active Address Stack 258 also contains the DNCO vector generation logic that will be described in details below.

The eviction logic 266, determines for every operation that goes through the pipe if the congruence class of the active operation has any available compartments to complete a fetch miss in by taking the information from DNCO vector from the active address stack 258 for that operation. It will indicate to the cache controller 238 which set it can use for fetch miss and if it is allowed to drop blocking of new operations for that congruence class after it receives its designated set.

In one or more embodiments, the cache controller 238 also includes castout logic 266 that operates to evict, castout, or purge out data from sets marked as killed within each index of the section of cache 151. Castout logic 266 may be hardware or software logic.

Figure 3:
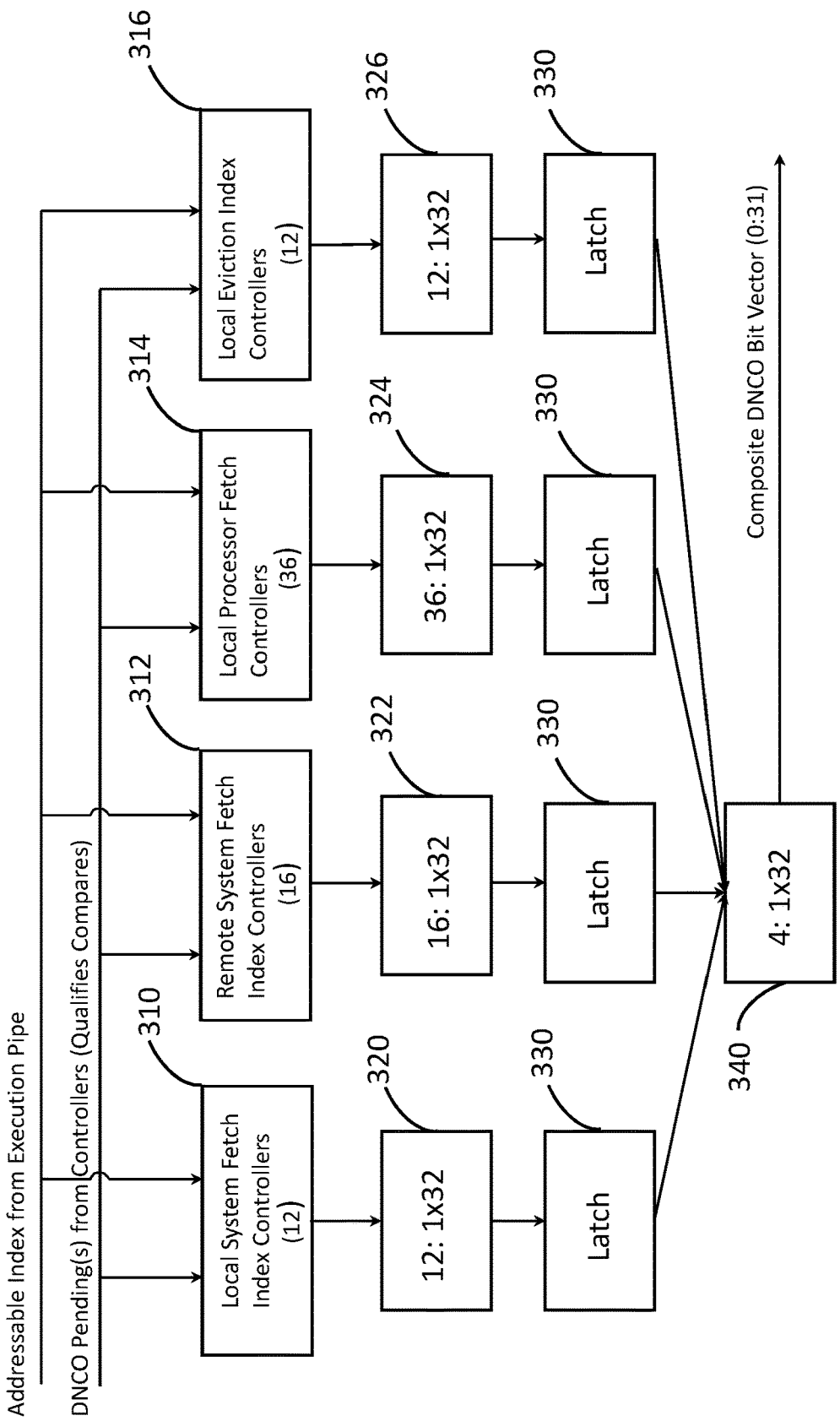
FIG. 3 is a block diagram illustrating controller pipe pathways generating vectors for identifying active sets or compartments of the cache where the controllers are working on live data according to one or more embodiments of the present invention.

Referring to FIG. 3, a block diagram depicts an exemplary embodiment of controller pipe pathways of a plurality of cache controllers 238. The cache controllers may be, for example, local system fetch index controllers 310, remote system fetch index controllers 312, local processor fetch index controllers 314, and local eviction index controllers 316. Other types of controllers may also be used in addition to or in place of the controllers depicted in FIG. 3. Also, in FIG. 3, there are twelve local system fetch index controllers 310, sixteen remote system fetch index controllers 312, thirty-six local processor fetch controllers 314, and twelve local eviction index controllers 316. However, the number and type of controllers depends on the type and size of the particular cache.

Each controller 310, 312, 314, 316 will contain an indication that it is working on an active operation with specific set (DNCO pending) and an indication that it's working on an active operation with a set in the congruence class and thus the whole congruence class needs to be blocked (Congruence Class block pending). Another indicator cache controller 238 will provide its valid operation indicator. In accordance with embodiments of the present invention, in the event of one of the controllers 310, 312, 314, 316 receiving a cache miss in a particular congruence class 210 having a given addressable index of the cache 151 it can be determined, at the time of set selection for the cache miss, whether one or more of the other cache controllers 310, 312, 314, 316 are currently performing any operations in the same congruence class 210 having the given addressable index.

From the beginning of operation, the cache controller will have its congruence class block pending on. If any of the other cache controllers 310, 312, 314, 316 is currently performing operations in the same congruence class 210 having the given addressable index at the time of set selection for the cache miss, and any of them have their active DNCO pending indicator on along with congruence class block pending, then the operation is rejected and the cache controller waits until the congruence class block pending is dropped. If no active cache controller has congruence class block pending on, then each of the other controllers 310, 312, 314, 316 generate a vector identifying any active sets or compartments of the cache 151 that the controllers are working on. This vector is generated in active address stack 258 by decoding the compartment of any active controller that is operating in the same congruence class and will be gating it while the cache controller is active, its DNCO pending indication is on, and does not have its congruence class block pending indication on.

When there are 32 sets in the congruence class, for example, there are twelve 32 bit vectors generated for twelve local system fetch index controllers 310 as shown in block 320. Also, block 322 depicts sixteen 32 bit vectors for the sixteen remote system fetch controllers 312, block 324 depicts thirty-six 32 bit vectors for the thirty-six local processor fetch index controllers 314, and block 326 depicts twelve 32 bit vectors for the twelve local eviction index controllers 316. This decoded vector of the compartment of each set of controllers is then or'd together to form a vector of all active index controllers of the same type and which compartments they are currently working on. The oring of those vectors in each group happens before the 32 bit latch 330. If any of the controllers 310, 312, 314, 316 are currently working on live data, in the same congruence class 210 having the given addressable index, the vectors will identify the compartments or memory elements that are necessarily unavailable in the same congruence class having the given addressable index as the cache miss. Thus, the compartments identified as unavailable are unavailable because of the one or more other cache controllers 310, 312, 314, 316 currently performing operations on the unavailable compartments and, therefore, the unavailable compartments are precluded from being picked for any operations that are initiated during the time that the cache controllers are active on those compartments.

Also, in one or more embodiments, at least one set in the given congruence class having the given addressable index is free from being designated with a marked bit inside the cache directory for each set to indicate which sets are unavailable or inaccessible as a result of an active operation. Those marked bits would be set by cache controllers once the set is assigned to them by the eviction logic and it will be reset once the operation completes and the set is free to be used for subsequent operations.

Because it is known which compartments are unavailable in the congruence class corresponding with the cache miss, it is possible to identify which compartments are then accessible and available to be operated on in that same congruence class having the given addressable index at the time of set selection for the cache miss. In other words, the available compartments in the given congruence class having the given addressable index are any compartments other than the unavailable compartments in the given congruence class having the given addressable index and other than the compartment corresponding with the cache miss. Multiple compartments that have been identified as available may be accessed simultaneously for subsequent operations in the given congruence class.

Thus, at the time of the set selection for a cache miss, any type of operation, such as a fetch or miss operation, may still be subsequently performed on the available compartments in the given congruence class having the given addressable index. In one or more embodiments, such an operation being performed on an available compartment in the given congruence class is other than a replacement operation.

Still referring to FIG. 3, each of the vectors from the controllers 310, 312, 314, 316 and depicted by blocks 320, 322, 324, 326 are received at a latch 330. Each latch 330 indicates a break between consecutive cycles of the processor 121. From each latch 330 the DNCO bit vectors from the controllers 310, 312, 314, 316, based on the DNCO pending indications, are combined as shown in block 340 to generate a single composite DNCO bit vector which identifies which compartments in that congruence class are unavailable at the time of set selection for the cache miss. The composite DNCO bit vector is then sent to eviction logic 266 contained within the active address stack 258 which also contains the DNCO vector generation logic. The eviction logic 266 utilizes the composite DNCO bit vector to determine which compartments are unavailable or inaccessible to the new cache fetch miss. The eviction logic 266 picks an available compartment in the given congruence class having the given addressable index despite the simultaneous cache miss which was also recognized in that congruence class. Once controller 238 is assigned the compartment and the eviction logic 266 indicates it is safe to raise DNCO pending indication for this operation, it raises its own DNCO pending indication to the active address stack to indicate to the system the compartment it is currently actively using. This will be seen in the next cycle by the next operation and thus the next cache miss will not select this compartment.

If the number of unavailable compartment reaches a predefined threshold such as a default threshold of the maximum number of compartments in the given congruence class having the given addressable index minus 1 (N−1). The predefined threshold could also be a non-default threshold based on a maximum number of operations permitted to be outstanding at one time in the system. In either case, the eviction logic 266 in the central pipe then indicates to the controller that it cannot set its DNCO pending indicator and that it has to set congruence class block pending indicator to prevent any operations to that particular congruence class from starting until the controller 268 is complete because there is no more space in that congruence class for additional operations because all compartments within that congruence class are currently being used. If the number of other compartments in the given congruence class that have active operations is not less than the predetermined threshold, setting a DNCO pending for each of the other compartments which have an active operation is precluded.

In accordance with embodiments of the present invention, in the event of one of the controllers 310, 312, 314, 316 receiving an operation that ends up as a cache hit in a particular congruence class 210 having a given addressable index of the cache 151, it can be determined, at the time of set detection for the cache hit which set is the hit, what will be loaded into the active address stack 258. From the beginning of operation, the cache controller will have its congruence class block pending indication on. If any of the other cache controllers 310, 312, 314, 316 is currently performing operations in the same congruence class 210 having the given addressable index at the time of set detection for the cache hit, and any of them have their active indicator on along with congruence class block pending, then the operation is rejected and the cache controller waits until congruence class block pending is dropped.

If no active cache controller has congruence class block pending on, the cache controller captures the address and set into the active address stack. At the same time, the eviction logic 266 assesses the DNCO vector generated by the Active Address Stack 258 for this congruence class and determines if it is safe to raise DNCO pending for this operation in this congruence class or not. If permitted by the eviction logic 266, the cache controller raises its own DNCO pending indication to the active address stack to indicate to the system which compartment it is currently actively using and also drops the congruence class block pending at the same time. This will be seen in the next cycle by the next operation and thus will next cache miss will not select this compartment.

Figure 4:
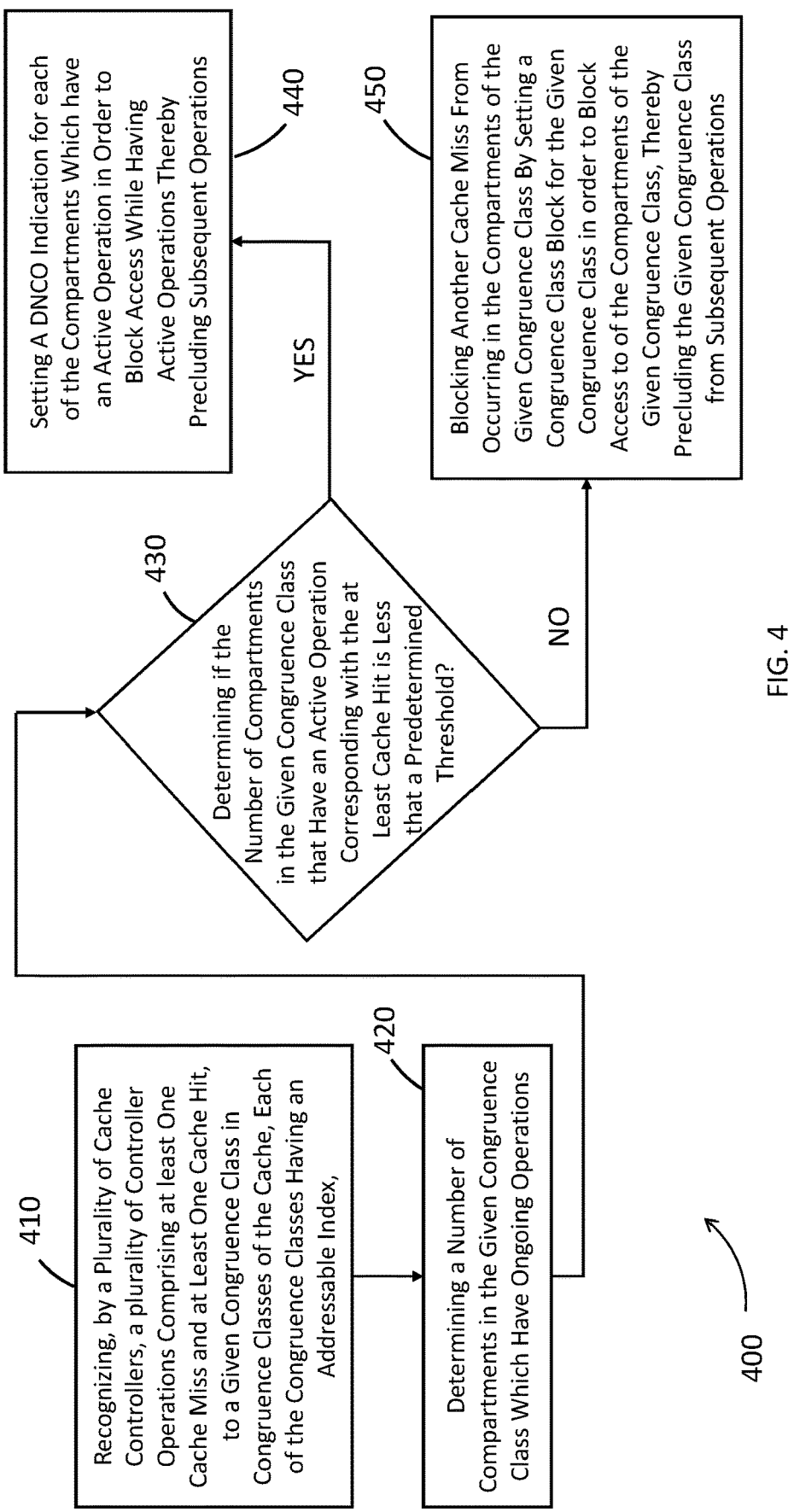
FIG. 4 is a flow diagram illustrating a method for enabling concurrent cache line operations to a plurality of cache sets of a congruence class according to one or more embodiments of the present invention.

Turning now to FIG. 4, a computer implemented method 400 for enabling concurrent cache line operations to a plurality of cache sets of a congruence class is illustrated according to a non-limiting embodiment. The flow diagram of FIG. 4 illustrates the method 400 that includes process block 410 for recognizing, by a plurality of cache controllers, a plurality of controller operations comprising at least one cache miss and at least one cache hit, to a given congruence class in congruence classes of the cache, each of the congruence classes having an addressable index, wherein the congruence classes are rows in the cache and sets are columns in the cache, such that each of the sets is included in each of the congruence classes, wherein the cache miss corresponds with a compartment in the given congruence class having a given addressable index, and wherein other sets are in the given congruence class having the given addressable index.

The method 400 also includes process block 420 for, in response to the cache miss in the given congruence class having the given addressable index, at the time of set selection for the cache miss, determining a number of other compartments in the given congruence class which have active operations. The method 400 also includes decision block 430 for determining if the number of other compartments in the given congruence class that have an active operation is less than a predetermined threshold. If the number of other compartments in the given congruence class that have an active operation is less than a predetermined threshold, the method 400 includes setting a Do Not Cast Out (DNCO) pending for each of the other compartments which have an active operation in order to block access to each of the other compartments while having an active operation thereby precluding each compartment with blocked access from subsequent operations as shown in process block 440. If the number of other compartments in the given congruence class that have an active operation is not less than a predetermined threshold, the method 400 includes blocking another cache miss from occurring in the other compartments of the given congruence class by setting a congruence class block pending for the given congruence class in order to block access to each of the other compartments of the given congruence class, thereby precluding the given congruence class from subsequent operations as shown in process block 450.

The computer implemented method 400 may also include one or more other process blocks. In one or more embodiments, the method 400 can include, if the number other of compartments in the given congruence class that have an active operation is not less than a predetermined threshold, precluding setting of a DNCO indication for each of the other compartments that have an active operation. Also, the method 400 may include the predefined threshold being a default threshold of a maximum number of compartments in the given congruence class having the given addressable index minus one (N−1) or a non-default threshold of a maximum number of controller operations permitted to be outstanding.

In one or more embodiments, the method 400 can include simultaneously accessing multiple compartments that have been identified as available for subsequent operations in the given congruence class at the time of set selection for the cache miss, wherein the compartments that are available in the given congruence class are the compartments other than the unavailable compartments in the given congruence class having the given addressable index. The method 400 may also include, at the time of set selection for the cache miss, subsequently performing operations on the available compartments in the given congruence class having the given addressable index. At least one of the subsequent operations being performed on the available compartments in the given congruence class having the given addressable index may be other than a replacement operation. Also, each set in the given congruence class is free from being designated with a marked bit for indicating each set is unavailable as a result of an ongoing or active operation.

The method 400 may also include where blocking access to other compartments that have active operations includes generating a DNCO bit vector via each of the controllers that set DNCO pending indications. Also, the method 400 may include generating a composite DNCO bit vector from a combination of DNCO bit vectors generated from different cache controllers and providing the composite DNCO bit vector to eviction logic, wherein the eviction logic utilizes the composite DNCO bit vector to pick available compartments in the given congruence class having the given addressable index.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, that execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for enabling concurrent cache line operations to a plurality of cache sets of a congruence class, the method comprising:

recognizing, by a plurality of cache controllers, a plurality of controller operations to a given congruence class in congruence classes of the cache, each of the congruence classes having an addressable index, wherein the congruence classes are rows in the cache and sets are columns in the cache, such that each of the sets is included in each of the congruence classes, wherein a cache miss corresponds with a compartment in the given congruence class having a given addressable index, and wherein other sets are in the given congruence class having the given addressable index;

in response to the cache miss in the given congruence class having the given addressable index, at the time of set selection for the cache miss, determining a number of other compartments in the given congruence class that have an active operation;

determining if the number of other compartments in the given congruence class that have an active operation is less than a predetermined threshold;

if the number of other compartments in the given congruence class that have an active operation is less than a predetermined threshold, setting a Do Not Cast Out (DNCO) pending indication for each of the other compartments that have an active operation in order to block access to each of the other compartments while having an active operation thereby precluding each compartment with blocked access from subsequent operations; and if the number of other compartments in the given congruence class that have an active operation is not less than a predetermined threshold, blocking another cache miss from occurring in the other compartments of the given congruence class by setting a congruence class block pending indication for the given congruence class in order to block access to each of the other compartments of the given congruence class, thereby precluding the given congruence class from subsequent operations.

2. The computer implemented method of claim 1 further comprising, if the number of other compartments in the given congruence class that have an active operation is not less than a predetermined threshold, precluding setting of a DNCO indication for each of the other compartments that have an active operation.

3. The computer implemented method of claim 1 wherein the predefined threshold is a default threshold comprising a maximum number of compartments in the given congruence class having the given addressable index minus one (N−1).

4. The computer implemented method of claim 1 wherein the predefined threshold is a non-default threshold comprising a maximum number of operations permitted to be outstanding.

5. The computer implemented method of claim 1 further comprising simultaneously accessing multiple compartments that have been identified as available for subsequent operations in the given congruence class at the time of set selection for the cache miss, wherein the compartments that are available in the given congruence class are the compartments other than the unavailable compartments in the given congruence class having the given addressable index.

6. The computer implemented method of claim 1 further comprising, at the time of set selection for the cache miss, subsequently performing operations on the available compartments in the given congruence class having the given addressable index.

7. The computer implemented method of claim 6 wherein at least one of the subsequent operations being performed on the available compartments in the given congruence class having the given addressable index is other than a replacement operation.

8. The computer implemented method of claim 1 wherein each set in the given congruence class is free from being designated with a marked bit for indicating each set is unavailable as a result of an active operation.

9. The computer implemented method of claim 1 wherein blocking access to other compartments that have an active operation comprises generating a DNCO bit vector via each of the controllers which set DNCO pending indications.

10. The computer implemented method of claim 9 further comprising generating a composite DNCO bit vector from a combination of DNCO bit vectors generated from different cache controllers and providing the composite DNCO bit vector to eviction logic, wherein the eviction logic utilizes the composite DNCO bit vector to pick available compartments in the given congruence class having the given addressable index.

11. A cache of a computing system storing cache data and comprising cache controllers and processing circuits, wherein at least one cache controller recognizes a cache miss to a given congruence class in congruence classes of the cache, each of the congruence classes having its own addressable index, wherein the congruence classes are rows in the cache, wherein sets are columns in the cache, such that each of the sets is included in each of the congruence classes, wherein the cache miss corresponds with a compartment in the given congruence class having a given addressable index and other sets are in the given congruence class having the given addressable index, and in response to the cache miss in the given congruence class having the given addressable index, at the time of set selection for the cache miss:
 determining a number of other compartments in the given congruence class that have an active operation, and
 determining if the number of other compartments in the given congruence class that have an active operation is less than a predetermined threshold,
 wherein if the number of other compartments in the given congruence class that have an active operation is less than a predetermined threshold, setting a Do Not Cast Out (DNCO) pending indication for each of the other compartments that have an active operation in order to block access to each of the other compartments while having an active operation thereby precluding each compartment with blocked access from subsequent operations; and
 if the number of other compartments in the given congruence class that have an active operation is not less than a predetermined threshold, blocking another cache miss from occurring in the other compartments of the given congruence class by setting a congruence class block pending indication for the given congruence class in order to block access to each of the other compartments of the given congruence class, thereby precluding the given congruence class from subsequent operations.

12. The cache of claim 11 further comprising, if the number of other compartments in the given congruence class that have an active operation is not less than a predetermined threshold, precluding setting of a DNCO pending indication for each of the compartments that have an active operation.

13. The cache of claim 11 wherein the predefined threshold is a default threshold comprising a maximum number of compartments in the given congruence class having the given addressable index minus one (N−1).

14. The cache of claim 11 wherein the predefined threshold is a non-default threshold comprising a maximum number of operations permitted to be outstanding.

15. The cache of claim 11 wherein blocking access to other compartments that have an active operation comprises generating a DNCO bit vector via each of the controllers which set DNCO pending indications, and wherein the method further comprises generating a composite DNCO bit vector from a combination of DNCO bit vectors generated from different cache controllers and providing the composite DNCO bit vector to eviction logic, wherein the eviction logic utilizes the composite DNCO bit vector to pick available compartments in the given congruence class having the given addressable index.

16. A computer program product comprising a computer readable storage medium having program instructions embodied therewith, the program instructions executable by a computer processor to cause the computer processor to perform a method for enabling concurrent cache line operations to a plurality of cache sets of a congruence class, the method comprising:
 recognizing, by a plurality of cache controllers, a plurality of controller operations to a given congruence class in congruence classes of the cache, each of the congruence classes having an addressable index, wherein the congruence classes are rows in the cache and sets are columns in the cache, such that each of the sets is included in each of the congruence classes, wherein the cache miss corresponds with a compartment in the given congruence class having a given addressable index, and wherein other sets are in the given congruence class having the given addressable index;
 in response to the cache miss in the given congruence class having the given addressable index, at the time of set selection for the cache miss, determining a number of other compartments in the given congruence class that have an active operation;
 determining if the number of other compartments in the given congruence class that have an active operation is less than a predetermined threshold;
 if the number of other compartments in the given congruence class that have an active operation is less than a predetermined threshold, setting a Do Not Cast Out (DNCO) pending indication for each of the other compartments that have an active operation in order to block access to each of the other compartments while having an active operation thereby precluding each compartment with blocked access from subsequent operations; and
 if the number of other compartments in the given congruence class that have an active operation is not less than a predetermined threshold, blocking another cache miss from occurring in the compartments of the given congruence class by setting a congruence class block pending indication for the given congruence class in order to block access to each of the other compartments of the given congruence class, thereby precluding the given congruence class from subsequent operations.

17. The computer program product of claim 16 wherein the method further comprises, if the number of other compartments in the given congruence class that have an active operation is not less than a predetermined threshold, precluding setting of a DNCO pending indication for each of the compartments that have an active operation.

18. The computer program product of claim 16 wherein the predefined threshold comprises at least one of the following:
 a default threshold comprising a maximum number of other compartments in the given congruence class having the given addressable index minus one (N−1); and
 a non-default threshold comprising a maximum number of operations permitted to be outstanding.

19. The computer program product of claim 16 further comprising simultaneously accessing multiple compartments that have been identified as available for subsequent operations in the given congruence class at the time of set selection for the cache miss, wherein the compartments that are available in the given congruence class are the compartments other than the unavailable compartments in the given congruence class having the given addressable index.

20. The computer program product of claim 16 wherein blocking access to other compartments that have an active operation comprises generating a DNCO bit vector via each of the controllers which set DNCO indications, and wherein the method further comprises generating a composite DNCO bit vector from a combination of DNCO bit vectors generated from different cache controllers and providing the composite DNCO bit vector to eviction logic, wherein the eviction logic utilizes the composite DNCO bit vector to pick available compartments in the given congruence class having the given addressable index.

* * * * *